2,918,410

CONCENTRATION OF VITAMIN $B_{12}$ AND PRODUCTS OBTAINED

Robert P. Popino, West Windsor Township, Mercer County, N.J., and John E. Charlebois, deceased, late of Princeton, N.J., by Hervé D. Charlebois, legal representative, Montreal, Quebec, Canada, assignors, by mesne assignments, to American Cyanamid Company, New York, N.Y., a corporation of Maine No Drawing. Application June 26, 1953
Serial No. 364,472

15 Claims. (Cl. 167—81)

This invention relates to the concentration of vitamin $B_{12}$ activity from dilute aqueous solutions thereof such as fermentation broths, and particularly to the concentration of the vitamin $B_{12}$ activity by adsorption thereof with lignin as a precipitated edible plant product and use thereof as an animal food product or additive therefor.

The term vitamin $B_{12}$ refers to a growth promoting factor first made available from liver concentrates, and more recently, found to be naturally available in fermentation broths resulting from culture of the various microorganisms. Vitamin $B_{12}$ had been found to be a cyanocobalamine complex in which the cobalt is bonded to organic amine substance through coordinate valences of the Werner type. See Science 112 (1950), pages 354–355. As usual for coordinate valent complexes the cyano group is found to be displaced from the coordination sphere by other anions having strong coordination tendencies. Thus, for example, vitamin $B_{12a}$ is a hydroxo coordination cobalamine complex wherein the original $B_{12}$ cyano group has been replaced by hydroxo. Thus various modifications of Vitamin $B_{12}$ (cyano) are known, such as chloro-cobalamine, hydrogen sulfide-cobalamine, sulfato-cobalamine, and cyanato-cobalamine. Such modifications may be prepared by treatment of vitamin $B_{12}$ with the desired anion for displacement of the cyano group therein, as described in the above cited publication, for example by treatment of vitamin $B_{12}$ with water soluble chloride, sulfite, sulfate, sulfide, cyanate, etc. Each of such modifications of vitamin $B_{12}$ exhibit growth promoting activity variable from 30 to 100% of ordinary vitamin $B_{12}$, cyano-cobalamine, and the present method is available for concentration of any one or more vitamin $B_{12}$ modifications of these types from dilute aqueous solutions thereof, and accordingly the term "vitamin $B_{12}$ activity" as used hereinafter is intended to be generic thereto. Most commonly vitamin $B_{12}$ activity is made available commercially from various fermentation broths, for example it is found in the fermentation broth formed by the culture of *Streptomyces griseus* (Rickes et al., Science 108, pp. 634, 635, December 3, 1948), *Streptomyces aureofaciens* (Pierce et al., J.A.C.S., vol. 71, page 2952), various flavo bacteria, U.S. Patent 2,515,135, and various other microorganism cultures in media having a minute natural or added cobalt content.

It will appear that vitamin $B_{12}$ activity occurs in fermentation broths of widely variable character. Some fermentation broths are available as a by-product broth wherein a microorganism was cultured for other purpose such as production of antibiotics and from which the antibiotic may have been extracted in a primary treatment. Vitamin $B_{12}$ activity contained therein may be in a highly dilute stage ranging as low as .01 microgram per milliliter. The vitamin $B_{12}$ material may be ultimately extracted from such highly dilute solutions in "spent" broths in an economic manner.

In other cultures of microorganisms, as set forth above, the vitamin $B_{12}$ activity may be the primary component of the broth, and where it is present in concentrations exceeding 2 micrograms per milliliter either naturally resulting from fermentation cultures or dissolved in aqueous solutions substantially more concentrated from an intermediate stage of treatment. Thus, the present method provides a method for removing substantially all of the vitamin content from a highly dilute broth or a more efficient removal of vitamin $B_{12}$ from more concentrated solutions using an edible solubilized lignin as adsorbent.

According to the present invention, a purified lignin, preferably a pine wood lignin, which is made water soluble by conversion to the alkali metal salt either before or after addition, is dissolved in a solution containing vitamin $B_{12}$ activity such as a fermentation broth and precipitated therefrom to form a concentrate containing substantial quantities of the vitamin $B_{12}$ removed from the solution. It has been found that lignin is an edible and non-abrasive product highly useful in itself as an animal food extender, thereby having outstanding properties as a base material for adsorbing vitamin $B_{12}$ for use as an animal food additive or for direct ingestion as an animal food. Moreover, it is found to be an outstanding property of purified lignin of adsorbing and concentrating substantially all or the greater proportion of vitamin $B_{12}$ activity contained in solutions in condition of extreme dilution such as the fermentation broths discussed above.

Thus, in accordance with the preferred practice of this invention, a solution of an alkali metal salt of lignin, for example a solution of the sodium salt of lignin, is added to a fermentation broth containing .01 or more micrograms of vitamin $B_{12}$ activity per milliliter of solution. Thereafter, the lignin is precipitated by acidifyng the solution to a pH generally below 5, and preferably below 4, such as a pH in the range of 2.5 to 4, whereupon the lignin precipitates as an insoluble organic mass, while simultaneously adsorbing most, and generally substantially all, of the vitamin $B_{12}$ activity originally present in the solution to provide an organic concentrate which is edible and useful in itself as an animal food or additive for an animal food to enhance the vitamin $B_{12}$ activity content thereof, while simultaneously providing an outstanding adsorbent to concentrate vitamin $B_{12}$ activity from dilute solutions.

As indicated, the lignin may be dissolved alone to concentrate by precipitation therewith substantially all of the dissolved vitamin $B_{12}$ activity content of a solution thereof to produce a highly concentrated product which is edible in itself. It is preferred, however, to add other edible, preferably cellulosic, products to enhance the bulk of the precipitate for easy control and handling for purposes of accurately distributing the concentrate to various animal food forms. For this purpose, cellulose substances such as cellulose pulp may be added as a suspension to the solution containing vitamin $B_{12}$ activity to be concentrated prior to the precipitation of lignin, and the combined lignin precipitate and suspended matter filtered from the spent suspending aqueous medium to impart thereto a controlled bulk by the inert cellulose added thereto. Following this procedure, precipitated lignin may be formed containing from 0.1 to 100 micrograms of vitamin $B_{12}$ activity per gram of lignin-cellulosic adsorbate precipitated from solution, variable with the original vitamin content of the solution, and with the quantity of lignin and cellulosic material therein. The lignin and vitamin $B_{12}$ activity contained therein after precipitation may be modified to any further degree of dilution desired depending upon the further quantity of inert cellulosic product added with which the precipitated lignin is further blended. Thus, sufficient inert cellulose bulking component may be added to the broth to form a product which contains from only, for example, 0.02 and upward micrograms of vitamin $B_{12}$ activity per gram of lignin-cellulosic adsorbate, the lignin being the actual adsorbent and the cellulosic material being a bulking agent.

Various cellulosic products such as chopped hay, paper or dried cellulose pulp may be used, but it is preferred to use the fine cellulose filter aid such as Polycel to give optimum distribution and filtration of the precipitated mass from the spent broth liquor.

The purified lignin hereof is a product of pure lignin commercially available by treatment of wood products in the formation of paper by the various fiber liberation chemical methods as with alkali or sulfite salts. A preferred source of lignin is purified pine wood lignin and is available commercially as Indulin A, a product commercially available from the West Virginia Pulp & Paper Company under this trade name.

EXAMPLE I

Fifteen grams (15) of Indulin A (purified pine wood lignin, a product of the West Virginia Pulp & Paper Company) was suspended in 1500 ml. of a spent cobalt-enriched streptomycin broth containing 0.19 mcg. of vitamin $B_{12}$ activity per milliliter of solution by the L.L. turbidimetric assay. To this suspension a solution of sodium hydroxide was added until the pH of the solution had been brought to pH 11.

At this pH substantially all of the Indulin A was solubilized (i.e., a water-soluble sodium salt was formed). After reaching this state, a solution of sulfuric acid was added until the pH of the solution had been reduced to pH 4. At this pH the Indulin precipitated from solution (i.e., the water-insoluble free acid had formed) and in the process had adsorbed the bulk of the vitamin $B_{12}$ activity originally in solution.

After an appropriate period of stirring the acid suspension was filtered, and the filtrate showed a vitamin $B_{12}$ assay of only 0.0075 mcg./ml. indicating that 96% of the vitamin $B_{12}$ activity had been adsorbed from solution during the precipitation of the free acid form of the purified pine wood lignin.

EXAMPLE II

In a preferred procedure, 500 ml. of a filtered broth prepared expressly for production of vitamin $B_{12}$ activity and having a vitamin $B_{12}$ activity assay of 1.35 mcg./ml. by the L.L. turbidimetric assay, was added 5 grams of Polycel (an inert cellulosic filter-acid) and 22 ml. of a 23% solution (as Indulin A) of the sodium salt of Indulin A (equivalent to 5 grams of Indulin A or a 1% dose on a weight/volume basis). Phosphoric acid was then added to bring the pH of the solution to PH 4.0, thus precipitating the free acid form of Indulin A from solution. After stirring, the suspension was filtered, and the filtrate (560 ml.) showed a vitamin $B_{12}$ assay of only 0.1 mcg./ml., indicating that 92% of the vitamin $B_{12}$ activity had been adsorbed from solution during the precipitation of the free acid form of the purified pine wood lignin.

EXAMPLE III

To 20,000 ml. of an unfiltered (i.e., containing mycelium and insoluble fermentation ingredients) broth expressly prepared for production of vitamin $B_{12}$ activity and having an assay of 1.7 mcg. of vitamin $B_{12}$ per ml. via L.L. turbidimetric assay, was added 60 grams of Polycel (an inert cellulosic filter-aid) and a solution of the sodium salt of Indulin A containing the equivalent of 300 grams of the free acid form of Indulin A. Phosphoric acid was added to a pH of 4.0 and the suspension stirred and filtered.

The filtrate (22,000 ml.) showed a vitamin $B_{12}$ assay of only 0.2 mcg./ml., indicating that 88% of the vitamin $B_{12}$ activity had been adsorbed from solution during precipitation of the free acid form of the pine wood lignin.

The filter cake (consisting of mycelium, fermentation insolubles, Polycel and Indulin A with adsorbed vitamin $B_{12}$ activity) was dried in vacuo at 48° C. and the dry preparation ball-milled.

The milled, dry material weighed 641 grams and assayed 48 mcg. of vitamin $B_{12}$ activity per gram via the L.L. turbidimetric assay.

The total vitamin $B_{12}$ activity contained in the final product was 30,800 mcg., or represented 90.5% recovery of vitamin $B_{12}$ activity from the starting whole broth.

The product showed no loss in vitamin $B_{12}$ activity after storage at 37° C. for five weeks in the dry state.

EXAMPLE IV

To 1000 ml. of an unfiltered (i.e., containing mycelium and insoluble fermentation ingredients) broth expressly prepared for production of vitamin $B_{12}$ activity and having an assay of 3.9 mcg. of vitamin $B_{12}$ activity per ml. via L.L. turbidimetric assay was added 30 grams of a diatomaceous earth filter-aid and a volume of a 20% solution of the sodium salt of lignin (equivalent to 20 grams of the free acid form of lignin). The solution was agitated and the pH adjusted to 3.0 with sulfuric acid. The suspension was filtered and the cake washed.

The filtrate and washing (980 ml.) showed a vitamin $B_{12}$ assay of 0.138 mcg./ml., indicating that 96.5% of the vitamin $B_{12}$ activity had been adsorbed from solution during precipitation of the free acid form of lignin.

The filter cake (consisting of mycelium, fermentation insolubles, diatomaceous earth and lignin with adsorbed vitamin $B_{12}$ activity) was dried in vacuo at 50° C. for seventy-two hours and the dry preparation milled.

The milled dry material weighed 65 grams and assayed 53 mcg. of vitamin $B_{12}$ activity per gram via the L.L. turbidimetric assay.

The total vitamin $B_{12}$ activity contained in the final product was 3,440 mcg. or represented 88.3% recovery of vitamin $B_{12}$ activity from the starting whole broth.

EXAMPLE V

Both vitamin $B_{12}$ is crystalline form (tests groups 2 to 6) and vitamin $B_{12}$ activity contained as precipitated adsorbate on lignin as described in Example III (test groups 7 to 9) was blended with a high protein ration, as analyzed below, and fed to chicks in controlled but variable proportions as set forth below.

| Group | Supplement | Four Week Wt. g. | No. of Chicks | Approx. Lbs. Feed per Bird |
|---|---|---|---|---|
| 1 | None | 177 | 13 | 1.62 |
| 2 | 5 mcg. cryst. Vitamin $B_{12}$/kg | 208 | 18 | 1.17 |
| 3 | 10 mcg. cryst. Vitamin $B_{12}$/kg | 219 | 17 | 1.22 |
| 4 | 15 mcg. cryst. Vitamin $B_{12}$/kg | 219 | 14 | 1.63 |
| 5 | 20 mcg. cryst. Vitamin $B_{12}$/kg | 227 | 16 | 1.25 |
| 6 | 30 mcg. cryst. Vitamin $B_{12}$/kg | 226 | 18 | 1.17 |
| 7 | 52 mg. of product of Example III/kg. | 205 | 16 | 1.43 |
| 8 | 104 mg. of product of Example III/kg. | 207 | 18 | 1.17 |
| 9 | 208 mg. of product of Example III/kg. | 217 | 19 | 1.22 |

The four weeks' growth response obtained with day-old commercial hatchery New Hampshire chicks was the criterion of the test. The basal ration employed is as follows:

*High protein ration for APF chick assay*

| Ingredient: | Mg./100 g. ration |
|---|---|
| Wheat bran | 5 |
| Wheat middlings | 5 |
| Dehydrated alfalfa leaf meal | 5 |
| Soybean oil meal | 50 |
| Corn gluten meal | 10 |
| Steamed bone meal | 2 |
| Ground yellow corn | 18 |
| Granite grits | 2 |
| Limestone grits | 2 |
| Iodized salt | 0.5 |
| Fish oil | 0.2 |
| MnSO$_4$ | 0.025 |
| Thiamine | 0.3 |
| Riboflavin | 0.6 |
| Niacin | 5.0 |
| Calcium pantothenate | 2.0 |
| Pyridoxine | 0.4 |
| Inositol | 100 |
| Choline | 150 |
| p-Aminobenzoic acid | 10 |
| Biotin | 0.02 |
| Folic acid | 0.05 |
| Menadione | 0.05 |
| Alpha tocopherol | 0.3 |

From observation of the four-week weights it can be seen that the lignin-vitamin $B_{12}$ activity adsorbate clearly acts as an animal protein factor supplement. As little as 100 mg. of this additive per kilo of basal ration causes a growth response 30 grams greater in four weeks than the basal ration alone (e.g., an average weight of 207 grams for group 8 as compared to 177 grams for group 1).

In a quantitative sense, it can be calculated from the results of groups 8 and 9 that the lignin-vitamin $B_{12}$ activity adsorbate produced a growth response indicative of a vitamin $B_{12}$ content of about 50 mcg./g.; for example: since 104 mg. of additive per kilo (group 8) produced a growth response equivalent to that produced by 5 mcg. of crystalline vitamin $B_{12}$ per kilo (group 2), it can be calculated that 1000 mg. of the additive contains the equivalent of $$\frac{1000}{104} \times 5 = 48 \text{ mcg. of vitamin } B_{12}$$

Similarly, with 208 mg./kilo (group 9) producing a growth response equivalent to that produced by 10 mcg. of crystalline vitamin $B_{12}$ per kilo (group 3) it can be calculated that 1000 mg. of the lignin-vitamin $B_{12}$ additive contains the equivalent of $$\frac{1000}{208} \times 10 = 48 \text{ mcg. of vitamin } B_{12}$$

EXAMPLE VI

Prior to mixing the product of Example III with grain, it was pelleted by compression into small pellets approximately to cereal grain size and then mixed with the cereal grain according to Example V.

EXAMPLE VII

Short chopped lengths of 1 to 2 inches of hay were mixed with the Indulin A solution in quantity of 60 grams, according to Example III (instead of the Polycel mentioned therein), and the suspension was similarly acidified to precipitate the lignin, and the filter cake, after drying, was comminuted to short fiber lengths and blended with a hay in proportion of approximately one pound per 100 pounds of hay and used as a cattle food.

As thus described herein, purified lignin is useful to adsorb vitamin $B_{12}$ activity from highly dilute solution such as spent fermentation broths and may be precipitated therefrom to form a concentrate of vitamin $B_{12}$ directly useful as an animal food or as an additive for animal food, for which purpose it may be blended with inert cellulose bulking components.

Various types of broth may be used, as pointed out above, such as spent fermentation broths wherein vitamin $B_{12}$ activity is contained in a state of extreme dilution, the broth having been prepared by microorganism culture such as for preparation of antibiotics which may have been previously extracted from the broth to leave a spent broth having a minute content of vitamin $B_{12}$ activity adsorbable in lignin according to the present method. Alternatively, broths which are primary broths cultured directly for purposes of producing vitamin $B_{12}$ activity in higher concentrations may be treated according to the present method. Finally, solutions in a state of intermediate concentration, where the vitamin $B_{12}$ content may have been increased by a partial concentration by other methods over that usually obtained in fermentation broths, may be used herein as a broth material.

As indicated, the lignin adsorbate may be pelleted or nodulized or blended with long fibrous grasses to place the same in most advantageous form and in any degree of vitamin $B_{12}$ concentration, depending upon the particular type of animal food with which it is to be used.

Vitamin $B_{12}$ activity may be recovered in a partially purified state from a lignin adsorbate as described above as produced from spent streptomycin culture broths or broths expressly fermented for the production of vitamin $B_{12}$ by slurrying the lignin adsorbate with a water miscible solvent for the vitamin $B_{12}$ activity, for example lower molecular weight alcohols and ketones having from 1 to 6 carbon atoms partially diluted with water. The following aqueous solvents are useful: (a) a 90% aqueous solution of phenol; (b) a 50% aqueous solution of acetone; (c) an 80% aqueous solution of methanol; and (d) a 55% aqueous solution of ethanol. Other water miscible alcohols and ketones containing from 5 to 55% of water may be used variable only slightly in efficiency of extraction. While it is preferred merely to slurry the lignin adsorbate with the aqueous solvent as described, the same water miscible organic solvents may be applied to the concentrated lignin adsorbate in the absence of any substantial amount of water in a first step to obtain an extract which contains a substantial quantity of other impurities in addition to vitamin $B_{12}$ complex, and thereafter, water is added to the extracted solution to throw the impurities out of solution as a second step, and finally the aqueous solvent containing the vitamin $B_{12}$ activity is concentrated, after removing the insoluble impurities such as by filtration, with or without further purification by crystallization of the vitamin concentrate. The amount of water added to the water miscible organic solvent extraction is the amount required to throw the impurities out of solution and will depend on the solvent used and may be such as to adjust the aqueous content to the range indicated above. The following examples illustrate this procedure:

EXAMPLE VIII 3000 grams of lignin adsorbate obtained according to the procedure described in Example I above is slurried with 2 liters of an 80% aqueous methanol solution by agitation of the suspension for 15 minutes. The residual lignin solids are filtered from the solution and the solvent is evaporated to 50° C. in a vacuum oven. The residue of semipurified vitamin $B_{12}$ activity concentrate weighing 45 milligrams was obtained which could be further purified by crystallization if desired.

EXAMPLE IX 3000 grams of lignin adsorbate obtained as described in Example I was placed upon a filter (or the adsorbate cake of Example I may be used directly) and washed first with 1000 cc. of substantially dry methanol by continuously pouring the extract over the filter cake. A second extraction, with 300 cc. of dry methanol is applied to the partially extracted cake and then a final washing, again with 300 cc. of dry methanol, is applied to the substantially spent filtered cake as a final wash. All of the extracts are combined and diluted with 400 cc. of water. The various extracted impurities thrown out of solution by dilution with water are then filtered off and the clear aqueous methanol solution is run to dryness as described in Example VIII. A yield of 41 milligrams of crude concentrate is obtained which may be further purified by known procedure.

It will be appreciated that the present method is in sharp distinction to prior art proposals for adsorbing vitamin concentrates upon inorganic materials which are abrasive and inedible such as fuller's earth, which is generally harmful when used as an animal food.

Various modifications will occur to those skilled in the art, and it is intended that the examples given herein be regarded as illustrative and not limiting, except as defined in the claims appended hereto.

We claim:

1. The method of concentrating vitamin $B_{12}$ activity from dilute solutions thereof comprising dissolving therein a water-soluble alkali metal salt of lignin and then precipitating the lignin from the solution by acidifying the solution to a pH below 5 to obtain a lignin having adsorbed therein a substantial concentration of the vitamin $B_{12}$ activity.

2. The method of forming an animal food additive vitamin $B_{12}$ activity concentrate comprising dissolving a water soluble alkali metal salt of lignin in a dilute aqueous alkaline solution of vitamin $B_{12}$ activity and precipitating the lignin with adsorbed vitamin $B_{12}$ activity by acidifying the solution.

3. The method of concentrating vitamin $B_{12}$ activity from dilute aqueous solutions thereof comprising dissolving therein an alkali metal salt of purified wood lignin in the solution and then precipitating the lignin and vitamin $B_{12}$ activity adsorbed therein by acidifying the solution to a pH below approximately 5.

4. The method of forming an animal food additive containing vitamin $B_{12}$ activity in concentrated form comprising dissolving an alkali metal salt of purified lignin in a dilute aqueous solution of vitamin $B_{12}$ activity, adding to said solution a suspension of a bulking agent comprising a comminuted inert cellulose material, then acidifying the solution and precipitating lignin having adsorbed thereon a substantial quantity of the vitamin $B_{12}$ activity contained in the solution, and separating and drying the mixture of inert cellulose and precipitated lignin-vitamin $B_{12}$ activity.

5. The method of concentrating vitamin $B_{12}$ activity from dilute aqueous solutions thereof comprising dissolving therein an alkali metal salt of purified pine wood lignin and then acidifying the solution to a pH in the range of 2.5 to 5, thereby precipitating the pine wood lignin having adsorbed thereon a concentrate of the vitamin $B_{12}$ activity content of the solution.

6. The method of forming an animal food additive rich in vitamin $B_{12}$ activity comprising dissolving an alkali metal salt of pine wood lignin in a dilute aqueous solution of vitamin $B_{12}$ activity, adding a bulking agent comprising a comminuted inert cellulose material to the solution, and then precipitating the lignin therefrom by acidifying the solution to a pH below about 5 and then separating the combined cellulose and precipitated lignin adsorbate from the spent liquid suspending medium.

7. The method of separating vitamin $B_{12}$ activity from fermentation broths containing at least 0.01 microgram of vitamin $B_{12}$ per milliliter of solution comprising dissolving therein an alkali metal salt of purified lignin and then precipitating the lignin and vitamin $B_{12}$ activity adsorbed thereon by acidifying the solution to a pH below approximately 5.

8. The method of producing a concentrate of vitamin $B_{12}$ activity from a dilute aqueous solution thereof comprising dissolving therein an alkali metal salt of purified lignin, precipitating the lignin together with vitamin $B_{12}$ activity adsorbed thereon by acidifying the solution, extracting the vitamin $B_{12}$ activity contained in the lignin adsorbate thereof with a vitamin $B_{12}$ activity solvent selected from the group consisting of water miscible alcohols and ketones, and thereafter separating the solvent from the extracted vitamin.

9. The method of producing a concentrate of vitamin $B_{12}$ activity from a dilute aqueous solution thereof comprising dissolving therein an alkali metal salt of purified lignin, precipitating the lignin together with vitamin $B_{12}$ activity adsorbed thereon by acidifying the solution, extracting the vitamin $B_{12}$ activity contained in the lignin adsorbate thereof with a vitamin $B_{12}$ activity solvent selected from the group consisting of water miscible alcohols and ketones containing from 5 to 55% water, and thereafter evaporating the solvent from the extracted vitamin.

10. The method of producing a concentrate of vitamin $B_{12}$ activity from a dilute aqueous solution thereof comprising dissolving therein an alkali metal salt of purified lignin, precipitating the lignin together with vitamin $B_{12}$ activity adsorbed thereon by acidifying the solution, extracting the vitamin $B_{12}$ activity contained in the lignin adsorbate thereof with a vitamin $B_{12}$ activity solvent selected from the group consisting of water miscible alcohols and ketones, adding water to the extraction solvent to precipitate impurities dissolved by the solvent along with the vitamin $B_{12}$ activity, separating the precipitated impurities, and thereafter evaporating the solvent from the extracted vitamin.

11. An edible animal food product comprising purified wood lignin having adsorbed thereon at least 0.1 microgram of vitamin $B_{12}$ activity per gram of lignin.

12. An edible animal food product comprising purified pine wood lignin having adsorbed thereon at least 0.1 microgram of vitamin $B_{12}$ activity per gram of lignin.

13. An animal food product comprising a mixture of a bulking agent comprising a comminuted inert cellulosic material containing purified wood lignin having adsorbed thereon at least 0.1 microgram of vitamin $B_{12}$ activity per gram of lignin.

14. An animal food product comprising a bulking agent comprising a comminuted inert cellulosic material containing pine wood lignin having adsorbed thereon at least 0.1 microgram of vitamin $B_{12}$ activity per gram of lignin.

15. The method of recovering vitamin $B_{12}$ from dilute aqueous solutions thereof which comprises admixing therewith an aqueous alkaline solution of lignin, lowering the pH of the mixture until precipitation takes place of a lignin-vitamin $B_{12}$ complex, and recovering same.

References Cited in the file of this patent

UNITED STATES PATENTS

| | | |
|---|---|---|
| 2,530,416 | Wolf | Nov. 21, 1950 |
| 2,664,420 | Lott | Dec. 29, 1953 |